(12) United States Patent
Le Craz

(10) Patent No.: US 8,679,593 B2
(45) Date of Patent: Mar. 25, 2014

(54) METHOD FOR COATING A METAL SURFACE WITH A HYBRID LAYER

(75) Inventor: Sébastien Le Craz, Liege (BE)

(73) Assignee: Centre de Recherches Metallurgiques ASBL-Centrum Voor Research in de Metallurgie VZW, Brussels (BE)

( * ) Notice: Subject to any disclaimer, the term of this patent is extended or adjusted under 35 U.S.C. 154(b) by 149 days.

(21) Appl. No.: 12/737,292

(22) PCT Filed: Jun. 24, 2009

(86) PCT No.: PCT/EP2009/057861
§ 371 (c)(1),
(2), (4) Date: Aug. 12, 2011

(87) PCT Pub. No.: WO2010/000651
PCT Pub. Date: Jan. 7, 2010

(65) Prior Publication Data
US 2012/0148759 A1  Jun. 14, 2012

(30) Foreign Application Priority Data
Jul. 2, 2008  (BE) .................................. 2008/0368

(51) Int. Cl.
*B05D 3/06* (2006.01)
*B05D 3/04* (2006.01)

(52) U.S. Cl.
USPC ................. 427/557; 427/388.4; 427/386

(58) Field of Classification Search
None
See application file for complete search history.

(56) References Cited

U.S. PATENT DOCUMENTS

| | | | |
|---|---|---|---|
| 2003/0153722 A1* | 8/2003 | Gu et al. | 528/310 |
| 2004/0054044 A1 | 3/2004 | Bittner | |
| 2004/0116594 A1* | 6/2004 | Bhattacharjee et al. | 524/589 |
| 2007/0190259 A1* | 8/2007 | Bittner et al. | 427/407.1 |

FOREIGN PATENT DOCUMENTS

| | | |
|---|---|---|
| WO | 03/048403 | 6/2003 |
| WO | 2005/059196 | 6/2005 |

* cited by examiner

*Primary Examiner* — Timothy Meeks
*Assistant Examiner* — Ina Agaj
(74) *Attorney, Agent, or Firm* — Jacobson Holman PLLC

(57) ABSTRACT

The present invention relates to a method for coating a static or moving metal substrate with a simple or complex shape, by means of an ultra-thin mineral/organic hybrid coating layer with a thickness comprised between 50 to 500 nm, deposited on the substrate:
  from an aqueous solution comprising oxide nanoparticles, under basic pH conditions,
  said substrate being at a temperature lower than 50° C.,
  the total deposition and drying duration being less than 10 seconds,
wherein the aqueous solution further comprises at least one pre-polymer.

11 Claims, 2 Drawing Sheets ized to be part of an alloy of at least two of these metals;

METHOD FOR COATING A METAL SURFACE WITH A HYBRID LAYER

This is a national stage of PCT/EP09/057861 filed Jun. 24, 2009 and published in French, which claims the priority of Belgium number BE20080368 filed Jul. 2, 2008, hereby incorporated by reference.

FIELD OF THE INVENTION

The present invention relates to a method for coating a static or moving metal substrate of simple or complex shape by means of a mineral/organic hybrid protective layer.

The present invention is set in the continuity of coating methods notably described in international patent applications WO-A-03/048403 and WO-A-2005/059196.

STATE OF THE ART

Within the scope of the protection against corrosion for steel strips, the Applicant has been working for a certain number of years on alternative treatments to chromate treatment. Indeed, the latter using carcinogenic Cr(VI) has been banned from lines providing steel for domestic applications and a replacement method has therefore to be developed.

Various companies are working on these new treatments and propose a large variety of products. This includes the deposition of a stable oxide such as silica, zirconia or titanium oxide inter alia, or the deposition of phosphates, or the deposition of more organic depositions such as silanes.

The major difficulties of this type of treatment are a limited application time since the strip runs past very rapidly in the manufacturing lines, the near obligation of using existing equipment for achieving the deposition, the use of compounds with low risks for the operator and the environment, and finally performances that are equivalent to chromate treatment for a cost of the same order of magnitude, which thus implies a small thickness (50-500 nm).

In patent application WO-A-03/048403, the Applicant presents an invention related to a method for continuously coating a high-temperature substrate in motion by means of an ultra-thin protective layer (between 40 and 500 nm) from an aqueous solution with nanoparticles of oxide of silicon, titanium, zirconium, etc.

In patent application WO-A-2005/059196, the Applicant presents an improvement of the method described in international patent application WO-A-03/048403 thanks to the use of chemical additives which antagonistically influence the deposition reaction of an ultra-fine layer of oxide nanoparticles. The addition of such compounds allows to obtain layers with even smaller thickness than in the aforementioned application, i.e. with a thickness typically less than 100 nm.

AIMS OF THE INVENTION

The present invention aims to provide a method for covering a metal substrate with a hybrid coating layer conferring very high protection against corrosion on the metal.

The present invention also aims to provide a method for covering a metal substrate with a mineral/organic hybrid layer conferring excellent paint adhesion, within the scope of a use requiring paint application.

SHORT DESCRIPTION OF THE DRAWINGS

MAIN CHARACTERISTIC ELEMENTS OF THE INVENTION

Figure 1:
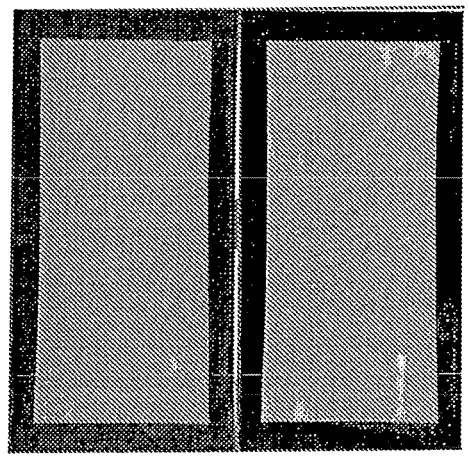
FIG. 1 illustrates a galvanised sample, continuously coated as in the method of the present invention and put in a saline mist (coating-layer thickness as measured by XPS: 120 nm). On the left, the photograph is taken after 24 hours and on the right after 48 hours.

The present invention discloses a method for coating a static or moving metal substrate with a simple or complex shape, by means of an ultra-thin mineral/organic hybrid layer having a thickness that is comprised between 50 to 500 nm and deposited on the substrate;
  from an aqueous solution comprising oxide nanoparticles, under basic pH conditions,
  said substrate being at a temperature below 50° C.,
  the total duration of the deposition and of the drying being less than 10 seconds,
wherein the aqueous solution further comprises at least one pre-polymer.

The present invention also discloses a flat or long metallurgical product, preferably a strip, wire, beam, profile or tube, coated with an ultra-thin protective layer by means of the method of the present invention, wherein said protective layer is a mineral/organic hybrid layer having a thickness comprised between 50 and 500 nm.

Particular embodiments of the invention include at least one or several of the following features:
  the substrate to be coated is either a bare metal, preferably steel, stainless steel (or corrosion-resisting steel), aluminium, magnesium, zinc or copper, or a first metal coated with a second metal, preferably a steel strip covered with a layer of zinc, aluminium, magnesium, copper or of an alloy of at least two of these metals;
  the oxide nanoparticles are selected from the group consisting of $SiO_2$, $TiO_2$, $ZrO_2$, $Al_2O_3$, $CeO_2$, $Sb_2O_5$, $Y_2O_3$, ZnO, $SnO_2$ and any mixtures of at least two of these oxides, have a size comprised between 1 and 20 nm and are found dispersed within the solution at a content comprised between 0.1 and 10%, and preferably between 1 and 10%;
  the pre-polymer is an organic compound resulting from the polycondensation reaction obtained by mixing a compound of a first category and a compound of a second category, the first category comprising a di-, tri-, tetra- or poly-amine, a di-, tri-, tetra- or poly-alcohol and a mixture of the latter, and the second category comprises a di-, tri-, tetra- or poly-carboxylic acid, a di-, tri-, tetra- or poly-carboxylic anhydride, a di-, tri-, tetra- or poly-epoxy, a di-, tri-, tetra- or poly-isocyanate and any mixture of at least two of the latter;
  the polymerization duration is determined according to the value of the parameters selected in the group consisting of the nature of the compounds retained in both categories, their proportion in the mixture, the temperature of this mixture and the desired polymerization state;
  the value of said parameters is determined so that the viscosity of the mixture to be reached after reaction is comprised between 3,000 and 25,000 cP (1 cP=1 mPa·s). The polymerization reaction is suspended by complete dissolution of the thereby formed pre-polymer in the basic aqueous medium. The reaction will completely end upon drying the solution on the substrate, in order to form a solid and insoluble layer. Pre-polymerization allows to guarantee complete polymerization of the layer applied on the metal substrate within a short time (a few seconds) and by heating a little (T<100° C. preferably);

an aqueous mixture of oxide nanoparticles and of pre-polymer is carried out in a basic aqueous medium with a pH comprised between 9 and 13;

the proportions of nanoparticles and of pre-polymer are such that 0.5<x<2, with $$x = \frac{mass_{nanoparticles}}{mass_{polymer}};$$

the aqueous solution deposited has a temperature below 50° C.;

the substrate to be coated has a temperature below 50° C.;

deposition is carried out on an on-line metal strip by wringing the solution deposited on the faces of the strip by means of a set of wringer rolls;

deposition is carried out on an on-line metal strip by means of a system of coating rolls;

deposition is carried out on any metallurgical product other than the strips by controlled spraying or dipping;

the deposited solution is then dried with hot air, by induction or with infra-red radiations.

DESCRIPTION OF A PREFERRED EMBODIMENT OF THE INVENTION

The object of the present invention is a method for covering a metal strip with a mineral/organic hybrid layer, called a <<silicalloy>>.

The hybrid layer as in the invention is formed by depositing a 100% water-based solution. The aforementioned solution comprises a mixture of silica nanoparticles for example (a size distribution between 1 and 20 nm) and of one or several pre-polymers, the whole in a basic medium (pH comprised between 9 and 13).

The pre-polymer is an organic compound obtained from the polycondensation reaction between two categories of compounds:

category 1: a di-, tri-, tetra- or poly-amine, a di-, tri-, tetra- or poly-alcohol or a mixture of the latter;

category 2: a di-, tri-, tetra- or poly-carboxylic acid, a di-, tri-, tetra- or poly-carboxylic anhydride, a di-, tri-, tetra- or poly-epoxy, a di-, tri-, tetra-, or poly-isocyanate or a mixture of two or several of the latter.

Figure 4:
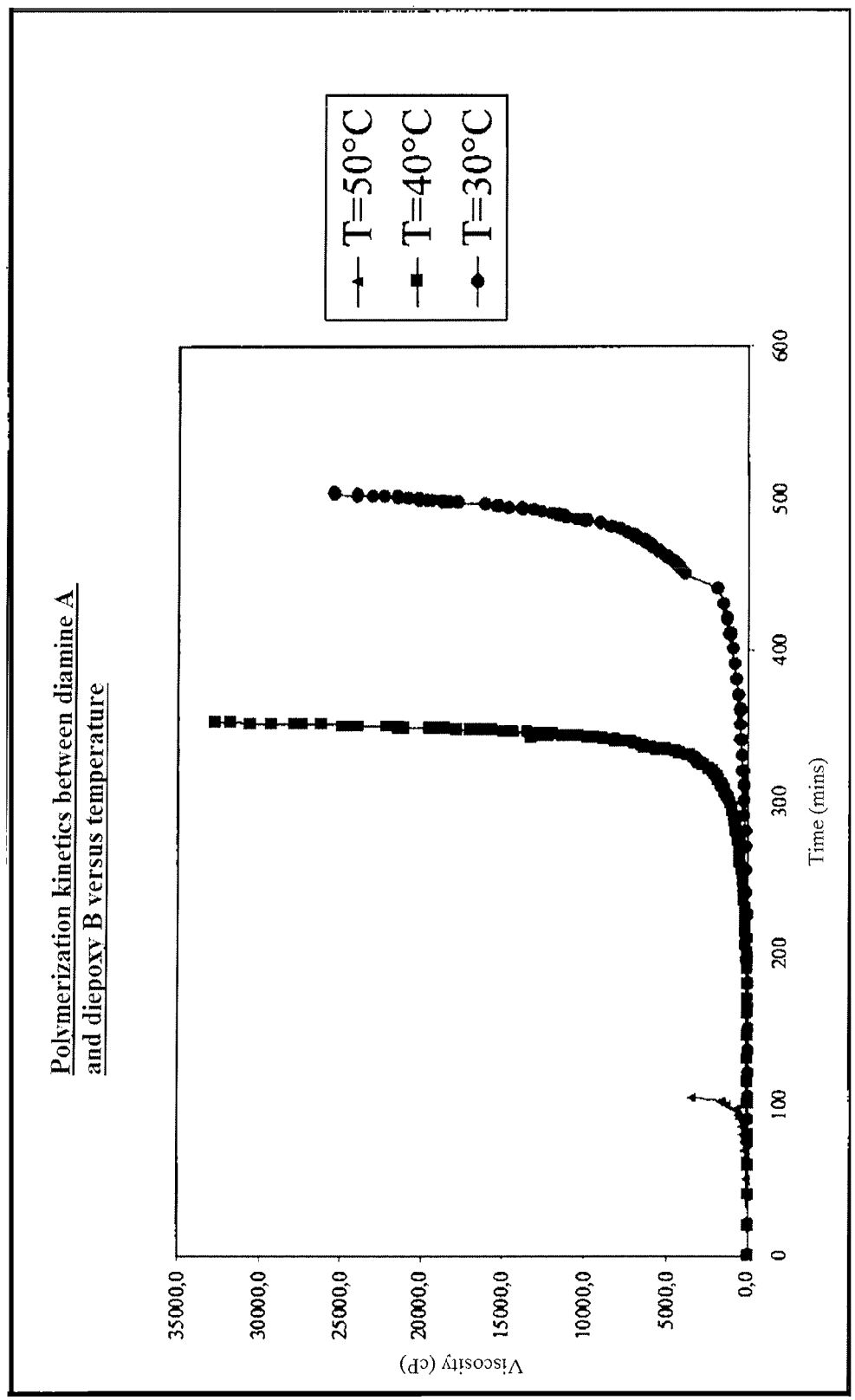
FIG. 4 shows the polymerization kinetics of a diamine and of a diepoxy in order to obtain a pre-polymer as in the invention, said kinetics being measured by the evolution of viscosity over time (at temperatures of 30, 40 and 50° C., respectively).

The reaction time varies according to the compounds depending on their category, their proportion, the temperature of this mixture and the desired polymerization state. The latter may be tracked by viscosity measurement. In FIG. 4, the evolution of this viscosity may be seen as a function of time, at different temperatures, for a mixture of a diamine A and of a diepoxy B in a stoichiometric proportion.

The thereby formed pre-polymer with the desired viscosity, preferentially comprised between 3,000 and 25,000 cP, is then dissolved into the remainder of the solution, which stops polymerization. The pre-polymer will finish cross-linking during the application of the solution, due to the evaporation of the water and the application temperature. The baking time remains less than 10 seconds.

The cold solution (T<50° C.) is applied on a cold metal sheet (T<50° C.) by means of application systems with rollers. These may be simple wringer rollers that only let the required amount through or else a system of roll-coaters. The solution applied is then dried with hot air, by induction or with infra-red radiations, in order to finally obtain a coating with a thickness comprised between 50 and 500 nm depending on the cases.

Result of Tests

FIG. 1 shows two images of a galvanised steel sample, coated by means of a layer as in the present invention, the coating being continuously achieved in this case on a pilot line and left in a saline mist for 120 hours. Both photographs are taken at respective intervals of 24 and 48 hours.

Figure 2:
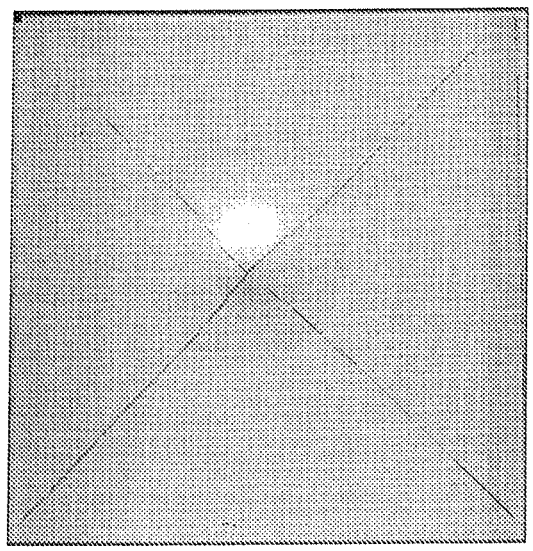
FIG. 2 illustrates a continuously treated sample as in the invention and painted, then deep-drawn and immersed in boiling water for 4 hours.

FIG. 2 shows a plate painted with a system of paints (primary paint+finishing paint for a building). The plate was cross-scratched, deep-drawn from the rear and deposited for 4 hours in boiling water. No delamination is observed once the plate had dried.

Figure 3:
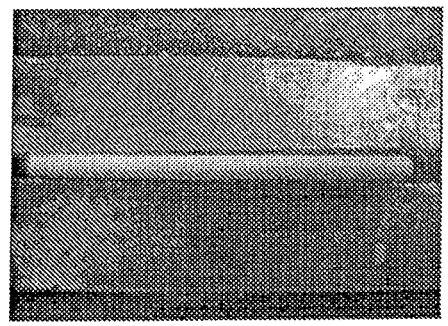
FIG. 3 illustrates a sample continuously treated as in the invention and painted and 1T-folded (T-bend test).

FIG. 3 shows a sample painted with the same system of paints and 1T-folded according to the T-bend test standard (ISO 17132:21007). No crack is apparent on the fold.

PREPARATION EXAMPLE 200 ml of demineralized water is poured into a 500 ml beaker and then 50 ml of an commercial aqueous dispersion of $SnO_2$ nanoparticles at 20% by mass are added. Potash is added thereto in order to reach a pH of 11. Next, in another 100 ml beaker, 3.5 g of 4,4-methylene-biscyclohexane amine (technical grade 95%) are mixed with 6.5 g of glycerol diglycidyl ether (technical grade) and this mixture is placed in a thermostated bath at 35° C. The viscosity of the mixture (indirectly the progress of polymerization) is measured in real time with a rotary viscosimeter or with a vibration viscosimeter. Once the viscosity of this mixture reaches 5000 cP (after 5 hours in the present case), the formed pre-polymer is slowly dissolved in the first beaker containing the tin oxide nanoparticles. Finally, the pH is rechecked and readjusted if necessary.

As an example for an online application, the solution, made as described above at a temperature of about 20° C., is sent by means of a pump onto a galvanised steel strip in motion. It is then wrung by rubber rollers. The excess liquid is recovered and recycled. As for the liquid remaining on the strip (between 1 to 2 ml/m²), it is heated by means of infrared lamps. The surface of the metal reaches 90-100° C. within 2 to 3 seconds, the water evaporates and the pre-polymer may finish cross-linking (at this temperature, the pre-polymer finishes cross-linking within a few seconds).

The invention claimed is:

1. A method for coating a static or moving metal substrate with a simple or complex shape, by means of an ultra-thin mineral/organic hybrid coating layer with a thickness comprised between 50 to 500 nm, deposited on the substrate, characterized by the following steps:

an aqueous solution consisting of oxide nanoparticles and compounds necessary to obtain basic pH conditions is prepared, an organic compound called a pre-polymer is prepared, resulting from the polycondensation reaction obtained by mixing a compound of a first category selected in the group consisting of a polyamine, a polyalcohol and a mixture of the latter, and a compound of a second category, selected from the group consisting of a polycarboxylic acid, a polycarboxylic anhydride, a polyepoxy, a polyisocyanate and any mixture of at least two of the latter;

the viscosity of the pre-polymer is measured in order to determine the state of progression of polymerization;

when the viscosity of the pre-polymer reaches a value comprised between 3,000 and 25,000 mPa·s, the pre-polymer is dissolved in said aqueous solution having a pH comprised between 11 and 13;

the solution is deposited on the substrate, which is found at a temperature below 50° C., the coated substrate is heated so that the total duration of deposition and drying is less than 10 seconds.

2. The method as in claim 1, wherein the substrate to be coated is either a bare metal or a first metal coated with a second metal.

3. The method as in claim 1, wherein the oxide nanoparticles are selected from the group consisting of $SiO_2$, $TiO_2$, $ZrO_2$, $Al_2O_3$, $CeO_2$, $Sb_2O_5$, $Y_2O_3$, $ZnO$, $SnO_2$ and any mixtures of at least two of these oxides, have a size of between 1 and 20 nm and are found in the solution at a content of between 0.1 and 10%.

4. The method as in claim 1, wherein the mass proportions x of nanoparticles and of pre-polymer are comprised between 0.5 and 2.

5. The method as in claim 1, wherein the solution deposited on the substrate has a temperature below 50° C.

6. The method as in claim 1, wherein the deposition is carried out on a metal strip on a continuous line by wringing the deposited solution on the faces of the strip by means of a set of wringer rollers.

7. The method as in claim 1, wherein the deposition is carried out on a metal strip on a continuous line by means of a system of coater rollers.

8. The method as in claim 1, wherein the deposition is carried out on any metallurgical product other than strips by controlled spraying or dipping.

9. The method as in claim 6, wherein the deposited solution is then dried with hot air, by induction or by infra-red radiations.

10. The method as in claim 2, wherein the bare metal is selected from the group consisting of: steel, stainless steel, corrosion-resisting steel, aluminium, magnesium, zinc and copper.

11. The method as in claim 2, wherein the first metal coated with a second metal is selected from the group consisting of: a steel strip covered with a layer of zinc, aluminium, magnesium, copper, and an alloy of at least two of these metals.

* * * * *

UNITED STATES PATENT AND TRADEMARK OFFICE
CERTIFICATE OF CORRECTION

PATENT NO.        : 8,679,593 B2               Page 1 of 1
APPLICATION NO.   : 12/737292
DATED             : March 25, 2014
INVENTOR(S)       : Sébastien Le Craz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 372 days.

Signed and Sealed this

Twenty-ninth Day of September, 2015

Michelle K. Lee
*Director of the United States Patent and Trademark Office*